US009140370B2

United States Patent
Kannoo et al.

(10) Patent No.: US 9,140,370 B2
(45) Date of Patent: Sep. 22, 2015

(54) CHANNEL SWITCHING VALVE AND HEAT PUMP SYSTEM USING THE SAME

(75) Inventors: Takeshi Kannoo, Tokyo (JP); Tomoatsu Minamida, Shiga (JP); Kouji Shibaike, Shiga (JP)

(73) Assignees: Fujikoki Corporation, Tokyo (JP); Daikin Industries, LTD., Osaka (JP)

( * ) Notice: Subject to any disclaimer, the term of this patent is extended or adjusted under 35 U.S.C. 154(b) by 1168 days.

(21) Appl. No.: 13/048,316

(22) Filed: Mar. 15, 2011

(65) Prior Publication Data

US 2011/0226001 A1    Sep. 22, 2011

(30) Foreign Application Priority Data

Mar. 17, 2010    (JP) ................................. 2010-060983

(51) Int. Cl.

| B01D 15/00 | (2006.01) |
|---|---|
| F16K 11/074 | (2006.01) |
| F16K 11/00 | (2006.01) |
| F16K 11/02 | (2006.01) |
| F16K 31/04 | (2006.01) |
| F16K 11/085 | (2006.01) |

(52) U.S. Cl.

CPC ............ F16K 11/074 (2013.01); F16K 31/041 (2013.01); *F16K 11/00* (2013.01); *F16K 11/02* (2013.01); *F16K 11/0856* (2013.01); *F16K 31/04* (2013.01)

(58) Field of Classification Search

CPC ..... F16K 11/00; F16K 11/02; F16K 11/0856; F16K 31/04

USPC ............. 137/625.43, 625.32, 625.29, 625.46; 62/324.6, 525

See application file for complete search history.

(56) References Cited

U.S. PATENT DOCUMENTS

| 2,973,014 | A | | 2/1961 | Selwood | |
|---|---|---|---|---|---|
| 4,705,627 | A | * | 11/1987 | Miwa et al. | .................... 210/264 |
| 5,787,930 | A | | 8/1998 | Toyama | |
| 6,575,196 | B1 | * | 6/2003 | Creswell | .................. 137/625.46 |
| 7,204,271 | B2 | * | 4/2007 | Kasai et al. | .............. 137/625.46 |

FOREIGN PATENT DOCUMENTS

| GB | 2046406 | 11/1980 |
|---|---|---|
| JP | 62-14280 | 1/1987 |
| JP | 63-297877 | 5/1988 |

* cited by examiner

*Primary Examiner* — Frantz Jules
*Assistant Examiner* — Steve Tanenbaum
(74) *Attorney, Agent, or Firm* — McCarter & English

(57) ABSTRACT

A rotary type channel switching valve for use in a heat pump system is provided. The channel switching valve provides a plurality of channel switching means required when switching connection of a plurality of devices to parallel/series connection, e.g., in a system including the plurality of devices including inlet/outlet ports for a fluid. The channel-switching valve can play a role of a plurality of channel switching means which are required when connecting a plurality of heat exchangers in parallel when a refrigerant is passed in a normal direction, and when connecting a plurality of heat exchangers in series when the refrigerant is passed in a reverse direction, for example, in a heat pump including the plurality of heat exchangers, and thereby, can realize simplification of a configuration of the heat pump, reduction in an occupied space, cost and energy consumption, or the like.

13 Claims, 15 Drawing Sheets

(A)

(B)

(C)

CHANNEL SWITCHING VALVE AND HEAT PUMP SYSTEM USING THE SAME

CROSS REFERENCE TO RELATED APPLICATIONS

This application claims priority to Japanese Patent Application No. 2010-060983, filed Mar. 17, 2010, all of which is herein incorporated by reference in its entirety.

FIELD OF THE INVENTION

The present invention relates to a rotary type channel switching valve for use in a heat pump system (air conditioner) and the like, and a heat pump system using the same, and particularly relates to a channel switching valve which can play the role of a plurality of channel switching means which are required when switching connection of a plurality of devices to parallel connection and series connection, for example, in a system including the plurality of devices (for example, heat exchangers) including inlet ports and outlet ports for a fluid, and a heat pump system using the channel switching valve.

BACKGROUND OF THE INVENTION

A heat pump (air-conditioner) generally includes a compressor, an outdoor heat exchanger, an indoor heat exchanger, a gas-liquid separator, an expansion valve, a four-way switch valve and the like. For example, JP Utility Model Publication (Kokai) No. 62-14280 proposes that in a heat pump including a plurality of heat exchangers, the plurality of heat exchangers are connected in series when the refrigerant is passed in one direction (normal direction), whereas when the refrigerant is passed in the other direction (reverse direction), the plurality of heat exchangers are connected in parallel, for the purpose of enhancing thermal efficiency and the like.

The above described four-way switch valve sets the refrigerant passing direction of the refrigerant cycle to be from the compressor to the outdoor heat exchanger, the expansion valve (pressure-reducing capillary tube), the indoor heat exchanger, and finally to the compressor in this order at the time of cooling, and sets the refrigerant passing direction to be from the compressor to the indoor heat exchanger, the expansion valve, the outdoor heat exchanger, and finally to the compressor in this order at the time of heating.

SUMMARY OF THE INVENTION

When the heat pump described in the aforesaid JP Utility Model Publication (Kokai) No. 62-14280 is to be constructed, as the number of heat exchangers becomes larger, the more channel switching means for switching and shutting off the channels for the refrigerant are required, and this causes complication of the configuration, increase of the occupied space, cost and energy consumption (electric power consumption), and the like.

The present invention is made in view of such circumstances, and an object of the present invention is to provide a channel-switching valve which can play the role of a plurality of channel-switching means which are required when connection of a plurality of devices is switched to parallel connection and series connection in, for example, a system including the plurality of devices (for example, heat exchangers) including inlet ports and outlet ports for a fluid, and thereby, can realize simplification of the configuration of a heat pump system and the like, reduction in an occupied space, cost and energy consumption, and the like, and a heat pump system using the same.

In order to attain the above-described object, a channel-switching valve according to the present invention includes a valve main body provided with a valve chamber having an upper side valve seat section and a lower side valve seat section, a valve body which is rotated with upper and lower end surfaces of the valve body opposed to and in contact with the upper side valve seat section and the lower side valve seat section, and an actuator which rotationally drives the valve body, wherein a plurality of ports are formed in the upper side valve seat section, while a plurality of ports are formed in the lower side valve seat section, the valve body is provided with at least one communication path which can allow the upper and lower ports to communicate with each other, and the valve chamber is divided into an upper chamber section and a lower chamber section by the valve body.

Further, a channel-switching valve according to the present invention includes a valve main body provided with a valve chamber having an upper side valve seat section and a lower side valve seat section, a valve body which is rotated with upper and lower end surfaces of the valve body opposed to and in contact with the upper side valve seat section and the lower side valve seat section, and an actuator which rotationally drives the valve body, wherein a plurality of upper side inlet/outlet ports and an upper side main port are formed in the upper side valve seat section, while a plurality of lower side inlet/outlet ports which are paired with the plurality of upper side inlet/outlet ports, and a lower side main port are formed in the lower side valve seat section, the valve body is provided with at least one communication path which can allow the respective ports paired at a top and bottom to communicate with each other, and the valve chamber is divided into an upper chamber section and a lower chamber section by the valve body.

Further, a channel-switching valve according to the present invention includes a valve main body provided with a valve chamber having an upper side valve seat section and a lower side valve seat section, a valve body which is rotated with upper and lower end surfaces of the valve body opposed to and in contact with the upper side valve seat section and the lower side valve seat section, and an actuator which rotationally drives the valve body, wherein a plurality of upper side inlet/outlet ports and an upper side main port are formed in the upper side valve seat section, while a plurality of lower side inlet/outlet ports which are paired with the plurality of upper side inlet/outlet ports, and a lower side main port which is paired with the upper side main port are formed in the lower side valve seat section, the valve body is provided with at least one communication path which can allow the respective ports paired at a top and bottom to communicate with each other, and the valve chamber is divided into an upper chamber section and a lower chamber section by the valve body.

In a more specific and preferred mode, each of the upper side valve seat section and the lower side valve seat section is provided with four inlet/outlet ports, the valve body is provided with two of the communication paths to allow any two of the four pairs of inlet/outlet ports to communicate with each other, and the valve body can take a first rotation position in which the two communication paths do not allow any of the four pairs of inlet/outlet ports to communicate with each other, and a second rotation position in which the two communication paths allow any two ports among the four pairs of inlet/outlet ports to communicate with each other.

In another preferred mode, each of the upper valve seat section and the lower side valve seat section is provided with two inlet/outlet ports, the valve body is provided with one communication path to allow any one of the two pairs of inlet/outlet ports to communicate with each other, and the valve body can take a first rotation position in which the one communication path does not allow any of the two pairs of inlet/outlet ports to communicate with each other, and a second rotation position in which the one communication path allows any one port among the two pairs of inlet/outlet ports to communicate with each other.

Further, in another preferred mode, each of the upper side valve seat section and the lower side valve seat section is provided with [N] of inlet/outlet ports, the valve body is provided with 1 to [N−1] of the communication paths to allow any one to [N−1] of the [N] pairs of inlet/outlet ports to communicate with each other, and the valve body can take a first rotation position in which the 1 to [N−1] communication path or paths does not or do not allow any of the [N] pairs of inlet/outlet ports to communicate with each other, and a second rotation position in which the 1 to [N−1] communication path or paths allows or allow any one to [N−1] port or ports among the [N] pairs of inlet/outlet ports to communicate with each other.

In another preferred mode, the valve body can take a third rotation position in which only the main ports are allowed to communicate with each other, in addition to the first and the second rotation positions.

In still another preferred mode, on at least one end side of the communication path, a communication path seal member is fitted onto an open end of the communication path to prevent leakage into the valve chamber from the communication path, and to bring the open end of the communication path elastically into pressure contact with the valve seat section.

Further, in a more preferred mode, pressure receiving diameters of both ends of the communication path are set to be the same or substantially the same.

Further, in a more preferred mode, the valve body includes a valve chamber seal member for hermetically partitioning the upper chamber section and the lower chamber section of the valve chamber.

Further, in a more preferred mode, the actuator is provided on a side of the upper chamber section of the valve main body, and the valve main body is provided with a pressure equalizing hole which allows the upper chamber section and an inside of the actuator to communicate with each other.

Further, in a more preferred mode, the pressure equalizing hole opens to a port which does not communicate with the communication path of the valve body even when the valve body is rotated.

Meanwhile, a heat pump system according to the present invention includes a compressor, an expansion valve, a plurality of heat exchangers, and the above described channel-switching valve, wherein a connection state of the plurality of heat exchangers is switched from parallel connection to series connection, and from series connection to parallel connection in accordance with necessity, by the channel-switching valve.

In a more concrete and preferred mode, an actuator of the channel-switching valve is provided on a side of an upper chamber section formed in the valve main body, and a refrigerant discharged from the compressor is introduced into a side of a lower chamber section formed in the valve main body.

In a more preferred mode, the valve main body is provided with a pressure equalizing hole which allows the upper chamber section and an inside of the actuator to communicate with each other.

Further, in more preferable mode, the pressure equalizing hole opens to a port which does not communicate with a communication path of the valve body even when the valve body is rotated.

When the channel-switching valve according to the present invention is used in a heat pump system including a plurality of heat exchanges, for example, only one channel-switching valve can connect the plurality of heat exchangers in any of parallel and series connection. Therefore, by using the channel-switching valve of the present invention instead of a plurality of channel-switching means which are conventionally required in accordance with the number of heat exchangers, simplification of the configuration of the heat pump system, reduction in the occupied space, cost and energy consumption, and the like can be realized.

Further, the heat pump system according to the present invention can realize simplification of the configuration, reduction of the occupied space, cost and energy consumption and the like. When the high-temperature and high-pressure refrigerant which is discharged from the compressor is introduced into the side opposite to the side where the actuator of the channel-switching valve is disposed, durability of the actuator can be enhanced, and an accurate operation can be continued.

DESCRIPTION OF FIGURE ELEMENTS

10 CHANNEL-SWITCHING VALVE
11a, 12a, 13a, 14a UPPER SIDE INLET/OUTLET PORT
11b, 12b, 13b, 14b LOWER SIDE INLET/OUTLET PORT
15 MOTOR (ACTUATOR)
16 ROTOR
17 STATOR
20 VALVE MAIN BODY
21 VALVE CHAMBER
22A UPPER SIDE VALVE SEAT SECTION
22B LOWER SIDE VALVE SEAT SECTION
25a UPPER SIDE MAIN PORT
25b LOWER SIDE MAIN PORT
30, 130 VALVE BODY
31, 32 COMMUNICATION PATH
35 VALVE SHAFT
39 SEAL MEMBER
40 PLANETARY GEAR TYPE SPEED REDUCTION MECHANISM
51 O-RING
52 SQUARE RING
71, 72, 73, 74 HEAT EXCHANGER

DETAILED DESCRIPTION OF THE INVENTION

Hereinafter, embodiments of the present invention will be described with reference to the drawings.

Figure 1:
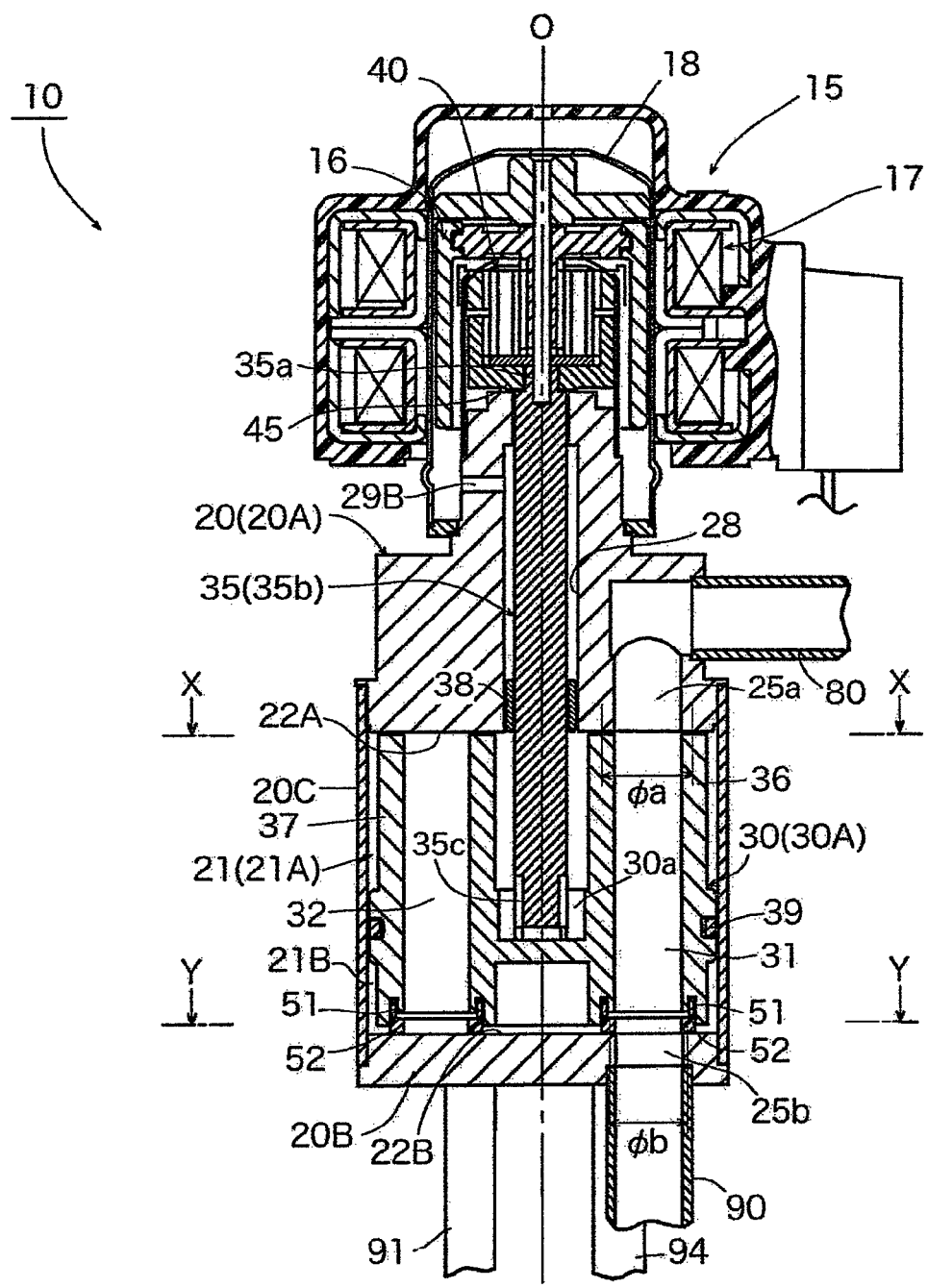
FIG. 1 is a vertical sectional view showing one embodiment (embodiment 1) of a channel-switching valve according to the present invention.
Figure 2:
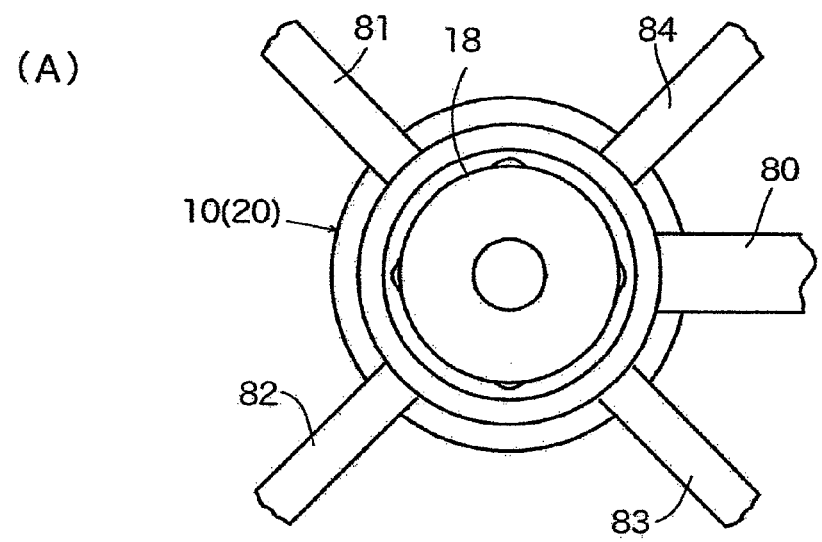
FIGS. 2A and 2B are a plane view and a bottom of the channel-switching valve with a stator removed and FIG. 2C is a side view of a valve body, of embodiment 1.
Figure 2:
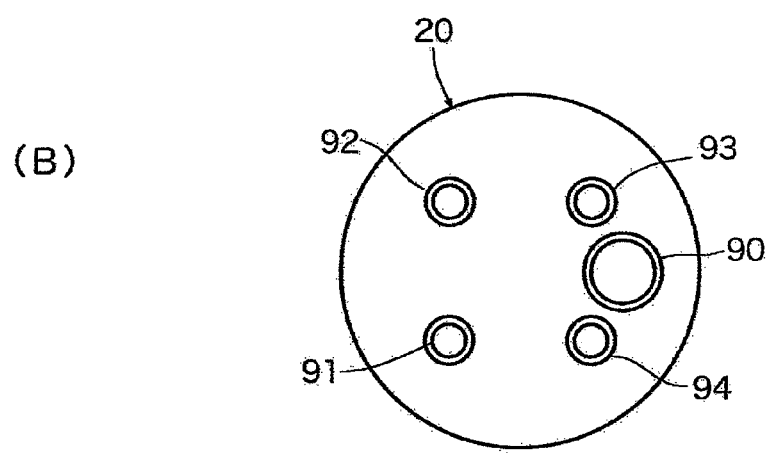
Figure 2:
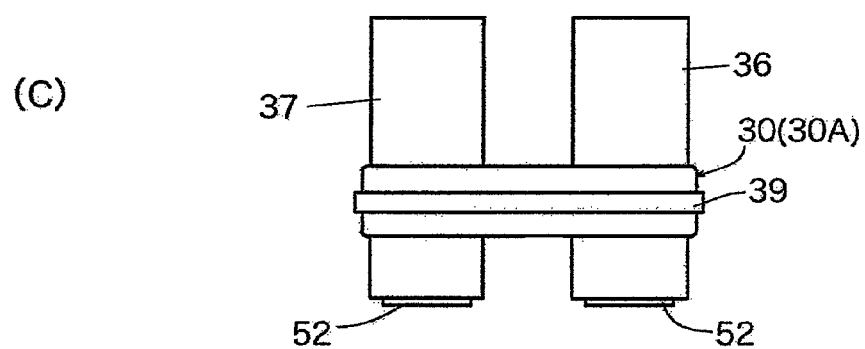
Figure 3:
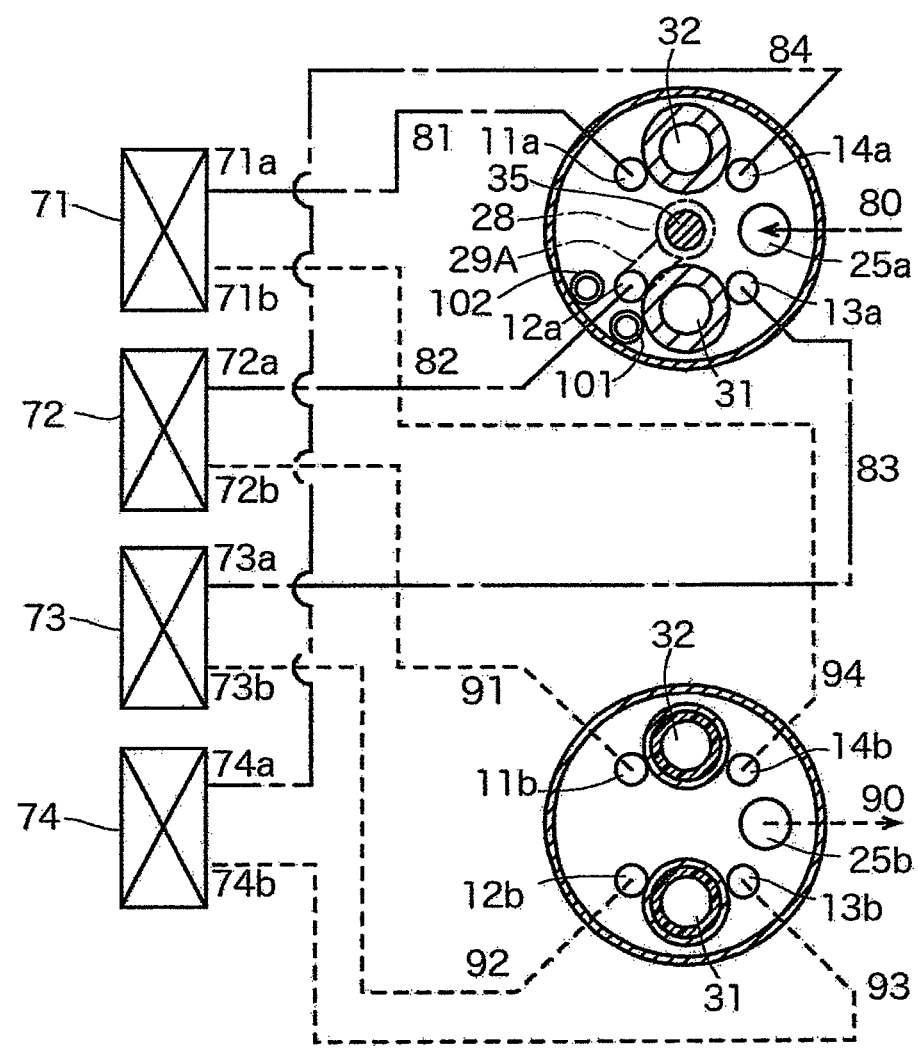
FIG. 3 is a view provided for explanation of a configuration and an operation of the channel-switching valve of embodiment 1 (cooling operation time).
Figure 4:
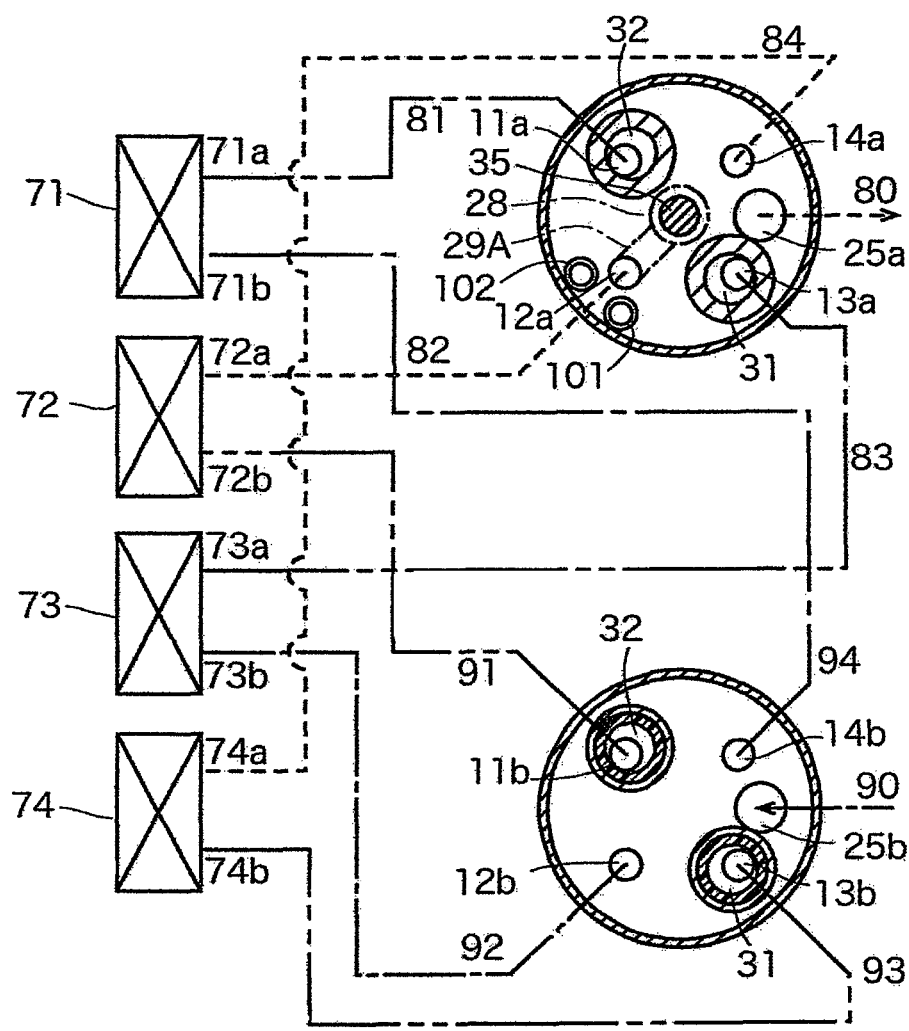
FIG. 4 is a view provided for explanation of the configuration and the operation of the channel-switching valve of embodiment 1 (heating operation time).
Figure 5:
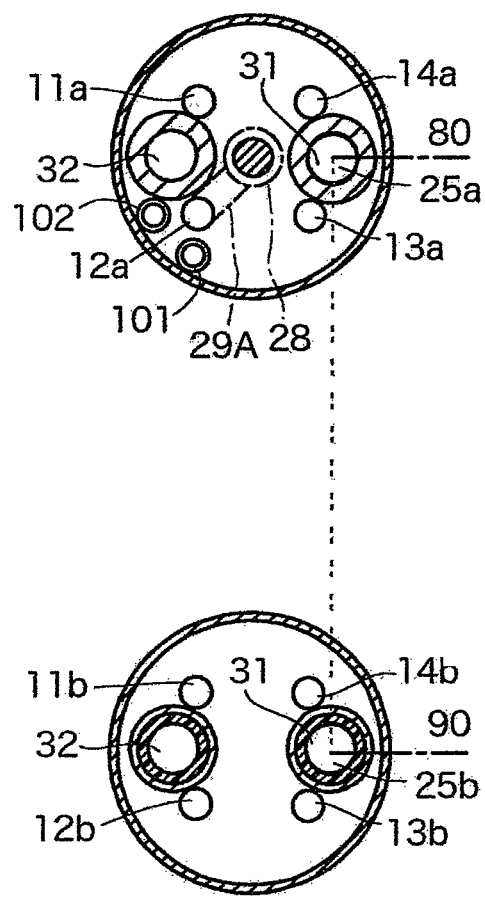
FIG. 5 is a view provided for explanation of the configuration and the operation of the channel-switching valve of embodiment 1 (defrosting operation time).

FIG. 1 is a vertical sectional view showing one embodiment (embodiment 1) of a channel-switching valve according to the present invention. FIGS. 2A and 2B are a plane view and a bottom view of the channel-switching valve with a stator 17 removed and FIG. 2C is a side view of a valve body, of embodiment 1. FIGS. 3, 4 and 5 are views each provided for explanation of a configuration and an operation of the channel-switching valve of embodiment 1 (cooling, heating and defrosting operation times), and in each of the drawings, the circular sectional view at the upper side is a sectional view taken along the line X-X indicated by arrows in FIG. 1, and the circular sectional view at the lower side is a sectional view taken along the line Y-Y indicated by arrows in FIG. 1. Further, FIG. 1 shows the state in which a communication path 31 of a cylindrical section 36 allows conduits 80 and 90 to communicate with each other as in FIG. 5.

In a heat pump system including four heat exchangers (for example, indoor heat exchangers) 71, 72, 73 and 74, a channel-switching valve 10 of the present embodiment can play a role of a plurality of channel switching means which are required in the case of connecting the aforesaid four heat exchangers 71, 72, 73 and 74 in parallel when the refrigerant is passed in a normal direction, and in the case of connecting the four heat exchangers in series when the refrigerant is passed in the reverse direction. The channel-switching valve 10 includes a stepping motor 15 as a channel-switching actuator, which is constituted of a rotor 16 placed at an inner peripheral side of a can 18, and a stator 17 which is fitted and fixed onto an outer periphery of the can 18, a valve body 30 which is rotated by the stepping motor 15 via a valve shaft 35, and a valve main body 20 which rotatably holds the valve body 30.

A planetary gear type reduction mechanism 40 is interposed between the aforesaid rotor 16 and valve shaft 35 (in the motor 15), and the rotation of the rotor 16 is considerably reduced by the above described reduction mechanism 40 to be transmitted to the valve body 30. The rotation of the rotor 16 may be directly transmitted to the valve body 30 without being transmitted via the planetary gear type reduction mechanism 40.

The valve main body 20 is constituted of an upper body 20A, a bottom lid-shaped body 20B, and a cylindrical body 20C which connects them. A cylindrical valve chamber 21 is defined by the upper body 20A, the bottom lid-shaped body 20B and the cylindrical body 20C.

The valve chamber 21 has its ceiling portion (bottom surface portion of the upper body 20A) formed as an upper side valve seat section 22A, and has its bottom surface portion (top surface portion of the bottom lid-shaped body 20B) formed as a lower side valve seat section 22B. The aforesaid upper body 20A is provided with four upper side inlet/outlet ports 11a, 12a, 13a and 14a which are L-shaped in section with one ends (lower ends) opened to the upper side valve seat section 22A (valve chamber 21) at intervals of about 90 degrees, and an upper side main port 25a which is L-shaped in section is formed between the upper side inlet/outlet ports 13a and 14a. Further, the bottom lid-shaped body 20B is provided with four lower side inlet/outlet ports 11b, 12b, 13b and 14b which have upper ends opened to the lower side valve seat section 22B (valve chamber 21) and are paired with the aforesaid four upper side inlet/outlet ports 11a, 12a, 13a and 14a at intervals of about 90 degrees, and a lower side main port 25b which is paired with the aforesaid upper side main port 25a is formed between the lower side inlet/outlet ports 13b and 14b.

The aforesaid valve shaft 35 has its upper end portion 35a connected to an output shaft 45 of the planetary gear type reduction mechanism 40 in the motor 15 to be integrally rotatable, and has its intermediate portion 35b inserted through a central hole 28 formed in the upper body 20A. A male spline section 35c which is provided at a lower end portion of the valve shaft 35 is fitted in a female spline section 30a provided in a central portion of the aforesaid valve body 30 to be integrally rotatable and relatively movable in a vertical direction. The intermediate portion 35b of the valve shaft 35 is rotatably supported by a bearing member 38 fitted in the central hole 28.

A pressure equalizing hole (communication path) 29B allows an inside of the can 18 and the central hole 28 to communicate with each other, and a pressure equalizing hole (communication path) 29A (FIG. 3) allows the central hole 28 and the upper side inlet/outlet port 12a to communicate with each other. The pressure equalizing hole 29A is provided in the upper body 20A, and is drawn by the phantom line in FIG. 3.

As is clearly understood with reference to FIG. 2C in addition to FIG. 1, the aforesaid valve body 30 has a base body section 30A in the shape of a thick disk having a slightly smaller outer diameter than a diameter of the aforesaid valve chamber 21. The female spline section 30a is provided in a central portion of the base body section 30A, and cylindrical sections 36 and 37 are provided to project in the vertical direction (direction parallel with a rotational center axis O) with an interval of 180 degrees at both sides of the female spline section 30a. The cylindrical sections 36 and 37 are formed to have substantially the same thickness from the top to the bottom, and an O-ring 51 and a square ring (packing) 52 as elastic seal members are fitted to lower end portions thereof in a tandem arrangement. The cylindrical sections 36 and 37 are rotated with their upper end surfaces and the aforesaid square ring 52 respectively opposed to and in contact with the aforesaid upper side valve seat section 22A and the lower side valve seat section 22B, and insides of the cylindrical sections 36 and 37 form communication paths 31 and 32 which can allow the inlet/outlet ports 11a and 11b and 13a and 13b, or the aforesaid main ports 25a and 25b which are paired at a top and bottom to communicate each other in accordance with the rotational position of the valve body 30 as will be described later.

Further, in order to divide the aforesaid valve chamber 21 into an upper chamber section 21A and a lower chamber section 21B and partition them hermetically, a valve chamber seal member (piston ring) 39 is fitted to an outer peripheral portion of the aforesaid valve body 30 so as to be elastically in pressure contact with an inner peripheral surface of the aforesaid valve chamber 21. If the valve chamber seal member 39 is disposed on the outer peripheral portion of the valve body 30 like this, hermeticity of the upper chamber section 21A and the lower chamber section 21B is ensured, but when the hermeticity is not required so much, or when the pressure difference between the upper chamber section 21A and the lower chamber section 21B is not so high, the valve chamber seal member 39 is not provided, and the outer peripheral portion of the valve body 30 may be directly slid in contact with an inner peripheral surface of the valve chamber 21.

Here, as described above, the male spline section 35c of the valve shaft 35 is fitted in the female spline section 30c of the valve body 30 to be integrally rotatable and relatively movable in the vertical direction, and the O-ring 51 and the square ring 52 as the elastic seal member (communication path seal member) are fitted to the lower ends of the cylindrical sections 36 and 37 (communication paths 31 and 32), whereby the square ring 52 which corresponds to open ends of the aforesaid communication paths 31 and 32 is elastically in pressure contact with the lower side valve seat section 22B. Therefore, leakage of the refrigerant into the valve chamber 21 (lower chamber section 21B) from the communication paths 31 and 32 can be prevented, and even if the height dimension of the valve chamber 21 somewhat differs from the height dimensions of the cylindrical sections 36 and 37, the difference can be absorbed.

The O-ring 51 and the square ring 52 may be provided at upper ends of the cylindrical sections 36 and 37 instead of being provided at the lower ends of the cylindrical sections 36 and 37, or may be provided at the upper and lower ends of the cylindrical sections 36 and 37 respectively.

Meanwhile, a conduit 80 is connected to the upper side main port 25a, and a conduit 90 is connected to the lower side main port 25b. Further, the upper side inlet/outlet port 11a and a first port 71a of the heat exchanger 71 are connected with a conduit 81. Similarly, the upper side inlet/outlet port 12a and a first port 72a of the heat exchanger 72 are connected with a conduit 82. The upper side inlet/outlet port 13a and a first port 73a of the heat exchanger 73 are connected with a conduit 83. The upper side inlet/outlet port 14a and a first port 74a of the heat exchanger 74 are connected with a conduit 84.

Further, the lower side inlet/outlet port 11b and a second port 72b of the heat exchanger 72 are connected with a conduit 91. Similarly, the lower side inlet/outlet port 12b and a second port 73b of the heat exchanger 73 are connected with a conduit 92. The lower side inlet/outlet port 13b and a second port 74b of the heat exchanger 74 are connected with a conduit 93. The lower side inlet/outlet port 14b and a second port 71b of the heat exchanger 71 are connected with a conduit 94.

In the channel-switching valve 10 configured as above, the valve body 30 is allowed to take a first rotation position at which the aforesaid two communication paths 31 and 32 do not allow any of the aforesaid four pairs of inlet/outlet ports 11a and 11b, 12a and 12b, 13a and 13b, and 14a and 14b to communicate with each other, as shown in FIG. 3, a second rotation position (rotated counterclockwise about 50 degrees from the first rotation position) at which the inlet/outlet ports 11a and 11b, and 13a and 13b out of the aforesaid four pairs of inlet/outlet ports are allowed to communicate with each other as shown in FIG. 4, and a third rotation position (rotated clockwise about 90 degrees from the first rotation position) at which the aforesaid main ports 25a and 25b are allowed to communicate with each other as shown in FIG. 5. The valve body 30 abuts to stoppers 101 and 102 set at the upper side valve seat section 22A, and thereby, is restricted to the position of FIG. 3 or FIG. 5.

Further, in this example, the aforesaid conduit 80 and conduit 90 are disposed in the heat pump system so that a discharged refrigerant from an expansion valve not illustrated flows into the channel-switching control valve 10 from the conduit 80, and the refrigerant flowing out of the conduit 90 reaches an intake port (not illustrated) of a compressor not illustrated at the time of cooling, whereas at the time of heating, the high-pressure and high-temperature refrigerant discharged from the compressor flows into the channel-switching control valve 10 from the conduit 90 and the refrigerant flowing out of the conduit 80 reaches the expansion valve.

In this case, when the valve body 30 is caused to take the first rotation position, and the refrigerant which flows out from the expansion valve is introduced into the upper chamber section 21A of the valve chamber 21 through the conduit 80 and the upper side main port 25a, as shown in FIG. 3, in order to perform a cooling operation, the refrigerant is guided from the first ports 71a to 74a of the respective heat exchangers 71 to 74 to the insides of the heat exchangers 71 to 74, the second ports 71b to 74b, the conduits 91 to 94, the lower chamber section 21B, the lower side main port 25b, and finally to the conduit 90 in this order through the upper side inlet/outlet ports 11a to 14a and the conduits 81 to 84 and returns to the compressor.

Accordingly, in the case of the normal direction flow (cooling operation time) when the refrigerant is guided into the upper side main port 25a and is guided out from the lower side main port 25b, the heat exchangers 71, 72, 73 and 74 are connected in parallel.

In contrast with this, when the valve body 30 is caused to take the second rotation position, and the refrigerant discharged from the compressor is introduced into the lower chamber section 21B of the valve chamber 21 through the conduit 90 and the lower side main port 25b, as shown in FIG. 4 in order to perform a heating operation, the refrigerant is guided from the lower side inlet/outlet port 12b to the conduit 92, the second port 73b of the heat exchanger 73, the inside of the heat exchanger 73, the first port 73a, the conduit 83, the upper side inlet/outlet port 13a, the communication path 31, the lower side inlet/outlet port 13b, the conduit 93, the second port 74b of the heat exchanger 74, the inside of the heat exchanger 74, the first port 74a, the conduit 84, the upper side inlet/outlet port 14a, the upper chamber section 21A, the upper side main port 25a, and finally to the conduit 80 in this order to reach the expansion valve, while the refrigerant is guided out from the lower side inlet/outlet port 14b to the conduit 94, the second port 71b of the heat exchanger 71, the inside of the heat exchanger 71, the first port 71a, the conduit 81, the upper side inlet/outlet port 11a, the communication path 32, the lower side inlet/outlet port 11b, the conduit 91, the second port 72b of the heat exchanger 72, the inside of the heat exchanger 72, the first port 72a, the conduit 82, the upper side inlet/outlet port 12a, the upper chamber section 21A, the upper side main port 25a, and finally to the conduit 80 in this order, and also reaches the expansion valve.

Accordingly, in the case of reverse direction flow (heating operation time) when the refrigerant is guided into the lower side main port 25b and guided out from the upper side main port 25a, the heat exchangers 73 and 74 are connected in series, the heat exchangers 71 and 72 are connected in series, and the group of the heat exchangers 73 and 74 and the group of the heat exchangers 71 and 72 which are connected in series are connected in parallel.

Further, the valve body 30 is caused to take the third rotation position, and only the upper side main port 25a and the lower side main port 25b are allowed to communicate with each other by the communication path 31 as shown in FIG. 5, whereby supply of the refrigerant to the heat exchangers 71 to 74 is shut off, the refrigerant is bypassed to the outlet port side, and a defrost operation is performed.

In each of the above described operations, the refrigerant which flows into the upper chamber section 21A flows into the can 18 from the upper side inlet/outlet port 12a through the pressure equalizing hole 29A, the central hole 28 and the pressure equalizing hole 29B. Therefore, the pressure difference between the upper chamber section 20A and the inside of the actuator 15 is reduced, or cancelled, and a favorable operation of the actuator 15 is ensured. Further, the pressure equalizing hole 29A allows the upper side inlet/outlet port 12a and the central hole 28 to communicate with each other, but the upper side inlet/outlet port 12a is sandwiched between the two stoppers 101 and 102, and is not shut off from the upper chamber section 20A by the communication path 31 or 32 of the valve body 30 even if the valve body 30 rotates. Accordingly, irrespective of the rotation position of the valve body 30, the cancel function of the above described pressure difference is always performed.

As above, the channel-switching valve 10 of embodiment 1 can, by itself, connect the heat exchangers 71 to 74 in parallel when the refrigerant is passed in the normal direction (cooling operation time), and connect the heat exchangers 71 to 74 in series when the refrigerant is passed in the reverse direction (heating operation time) in the heat pump including the four heat exchangers 71 to 74. Therefore, by using the channel-switching valve 10 of the present embodiment instead of a large number of channel-switching means which are conventionally required correspondingly to the number of heat exchangers, simplification of the configuration of the heat pump, reduction of the occupied space, cost and energy consumption, and the like can be realized.

Further, when the heat exchangers 71 to 74 are indoor heat exchangers, the high-temperature and high-pressure refrigerant which is discharged from the compressor at the time of heating flows into the side opposite to the side where the stepping motor 15 is disposed, namely, into the lower chamber section 21B of the valve main body 20 from the bottom lid-shaped body 20B. Therefore, as compared with the case in which the high-temperature and high-pressure refrigerant flows into the upper chamber section 21A, the influence on the stepping motor 15, for example, less demagnetization, deterioration or the like of the rotor magnet occurs, durability of the channel switching valve can be enhanced, and an accurate operation can be continued.

Further, a pressure receiving diameter (equivalent diameter receiving pressure, namely, the diameter of a substantial center of the portion of the end portion of the cylindrical section 36 abutting to the valve seat portion) φa of the upper end of the cylindrical section 36 of the valve body 30, and a pressure receiving diameter φb of the lower end are formed to be the same or substantially the same. Therefore, when the valve body 30 takes the third rotation position (FIG. 1 and FIG. 5), and the upper side main port 25a and the lower side main port 25b are allowed to communicate with each other by the communication path 31, even if the pressure difference exists between the inside of the communication path 31 and the upper chamber section 21A and the lower chamber section 21B, the pressure difference is balanced off at the upper end and the lower end of the cylindrical section 36, the force which is needed to rotate the valve body 30 thereafter is reduced, and smooth rotation is ensured.

Further, the pressure receiving diameter of the upper end and the pressure receiving diameter of the lower end of the cylindrical section 37 are configured to be the same or substantially the same, and therefore, for example, when the valve body 30 is rotated to the state of FIG. 4 or FIG. 5 from the state of FIG. 3, the difference between the pressure of the refrigerant filled inside the cylindrical sections 36 and 37 and the pressure in the aforesaid upper chamber section 21A and lower chamber section 21B is eliminated at the upper end and the lower end of the cylindrical sections 36 and 37 to reduce the force needed to rotate the valve body 30 thereafter, and smooth rotation can be ensured.

In the above described embodiment 1, the upper side valve seat section 22A and the lower side valve seat section 22B are provided with four inlet/outlet ports 11a to 14a and four inlet/outlet ports 11b to 14b respectively, the valve body 30 is provided with the two communication paths 31 and 32, and the valve body 30 can take the first rotation position in which the aforesaid two communication paths 31 and 32 do not allow any of the aforesaid four pairs of inlet/outlet ports 11a and 11b, 12a and 12b, 13a and 13b, 14a and 14b to communicate with each other, the second rotation position in which the two communication paths 31 and 32 allow the inlet/outlet ports 11a and 11b and 13a and 13b among the aforesaid four inlet/outlet ports to communicate with each other, and the third rotation position in which the main ports 25a and 25b are allowed to communicate with each other. However, the present invention is not limited to such a configuration.

More specifically, in order to give the channel switching function for connecting the heat exchangers in parallel when, for example, the refrigerant is passed in the normal direction, and connecting the heat exchangers in series when the refrigerant is passed in the reverse direction, each of the upper side valve seat section and the lower side valve seat section is provided with "N" of inlet/outlet ports, and the valve body is provided with one to [N−1] of the aforesaid communication paths to allow any one to [N−1] of the aforesaid "N" pairs of inlet/outlet ports to communicate with each other, and the aforesaid valve body is configured to take a first rotation position in which the aforesaid 1 to [N−1] communication paths do not allow any of the aforesaid "N" pairs of inlet/outlet ports to communicate with each other, and a second rotation position in which any one to [N−1] ports of the aforesaid [N] pairs of inlet/outlet ports are allowed to communicate with each other.

Figure 6:
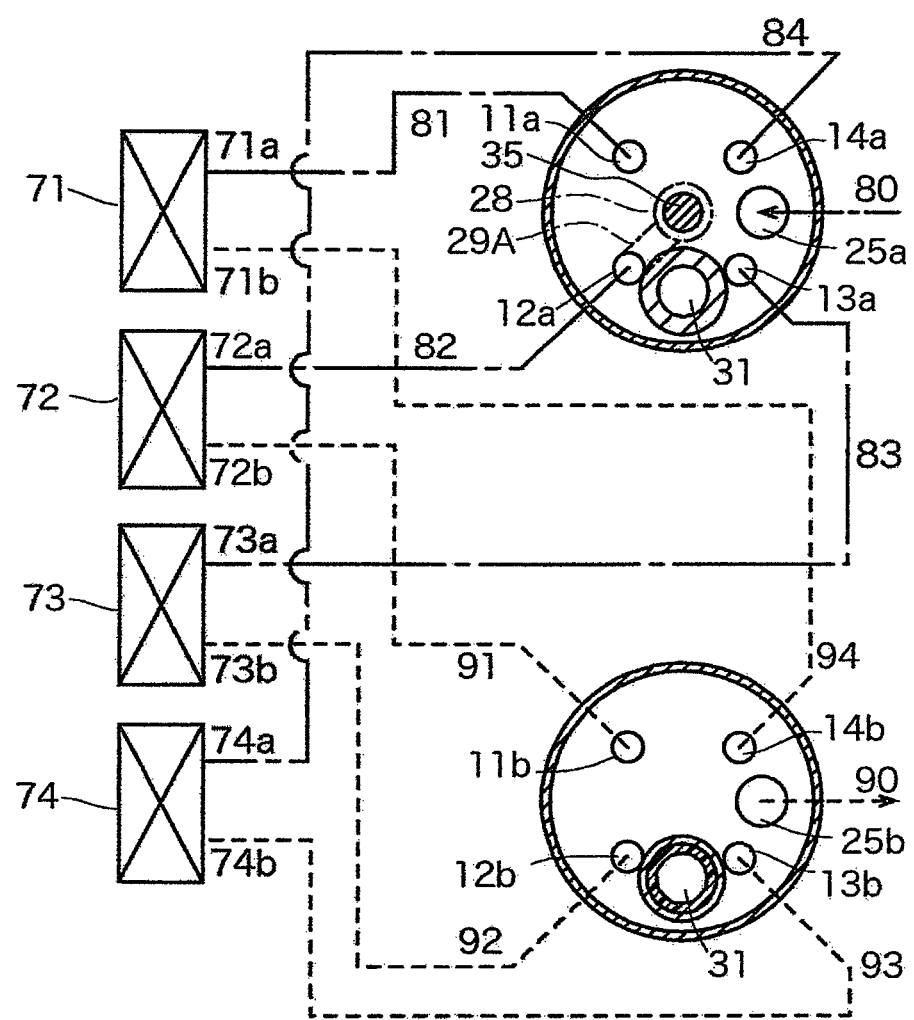
FIG. 6 is a view provided for explanation of a configuration and an operation of a channel-switching valve of embodiment 2 (cooling operation time).
Figure 7:
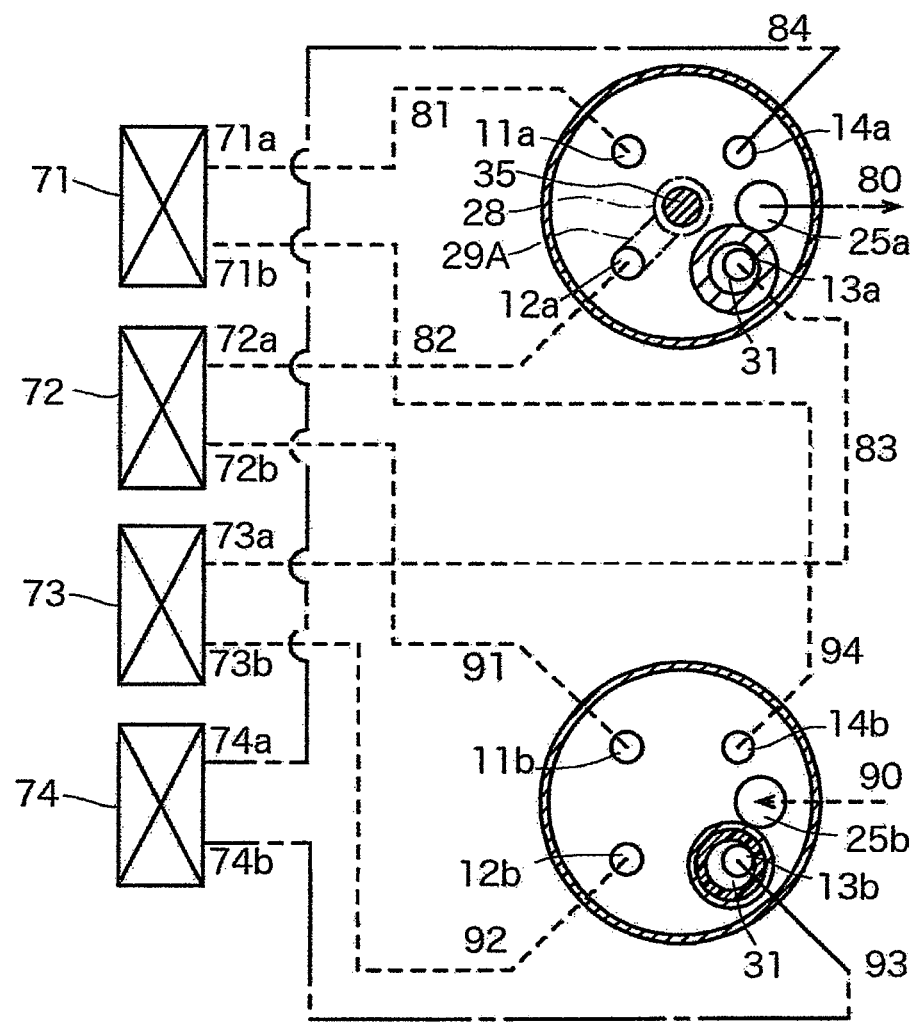
FIG. 7 is a view provided for explanation of the configuration and the operation of the channel-switching valve of embodiment 2 (heating operation time).
Figure 8:
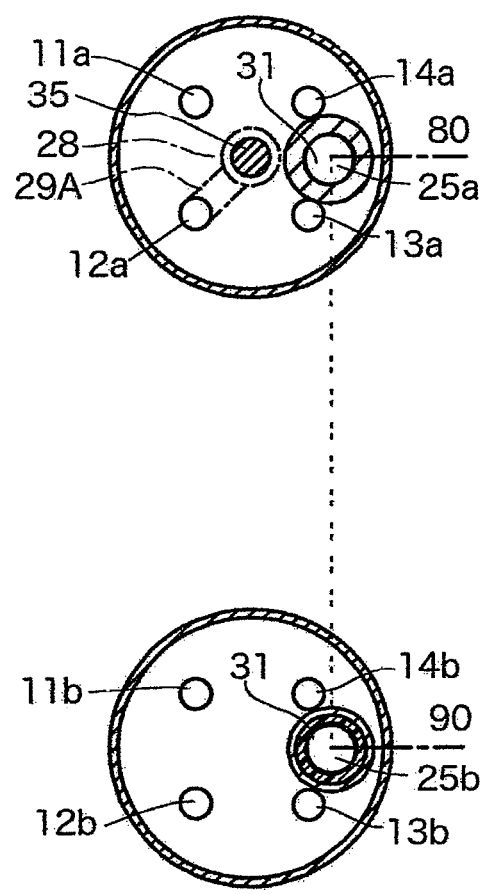
FIG. 8 is a view provided for explanation of the configuration and the operation of the channel-switching valve of embodiment 2 (defrosting operation time).

More concretely, when four inlet/outlet ports are provided at the top and bottom as in embodiment 2 shown in FIGS. 6 to 8, if one communication path (31) is adopted, the heat exchangers 71 to 74 are connected in parallel at the time of the normal direction flow (cooling operation time), but at the time of the aforesaid reverse direction flow (heating operation time), the heat exchangers 73 and 74 are connected in series and the series connection group and the remaining heat exchangers 71 and 72 are connected in parallel (FIG. 7).

Figure 9:
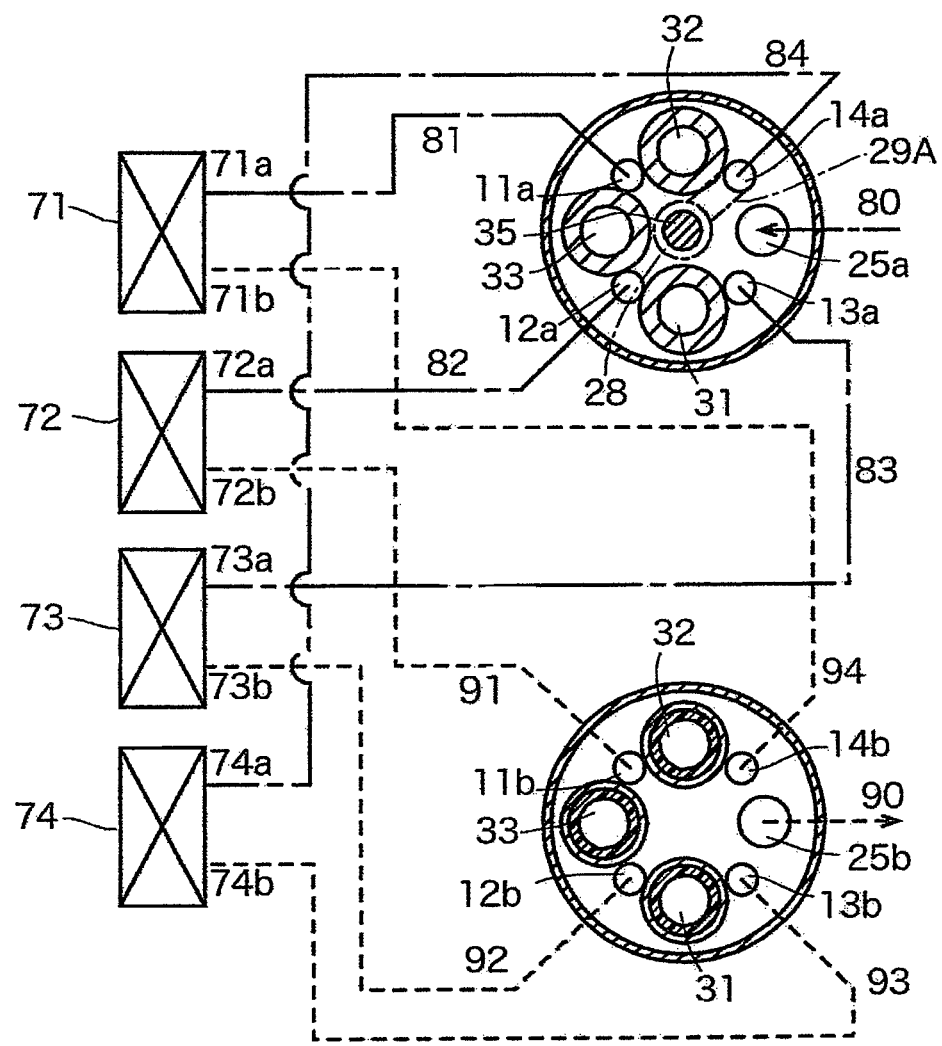
FIG. 9 is a view provided for explanation of a configuration and an operation of the channel-switching valve of embodiment 3 (cooling operation time).
Figure 10:
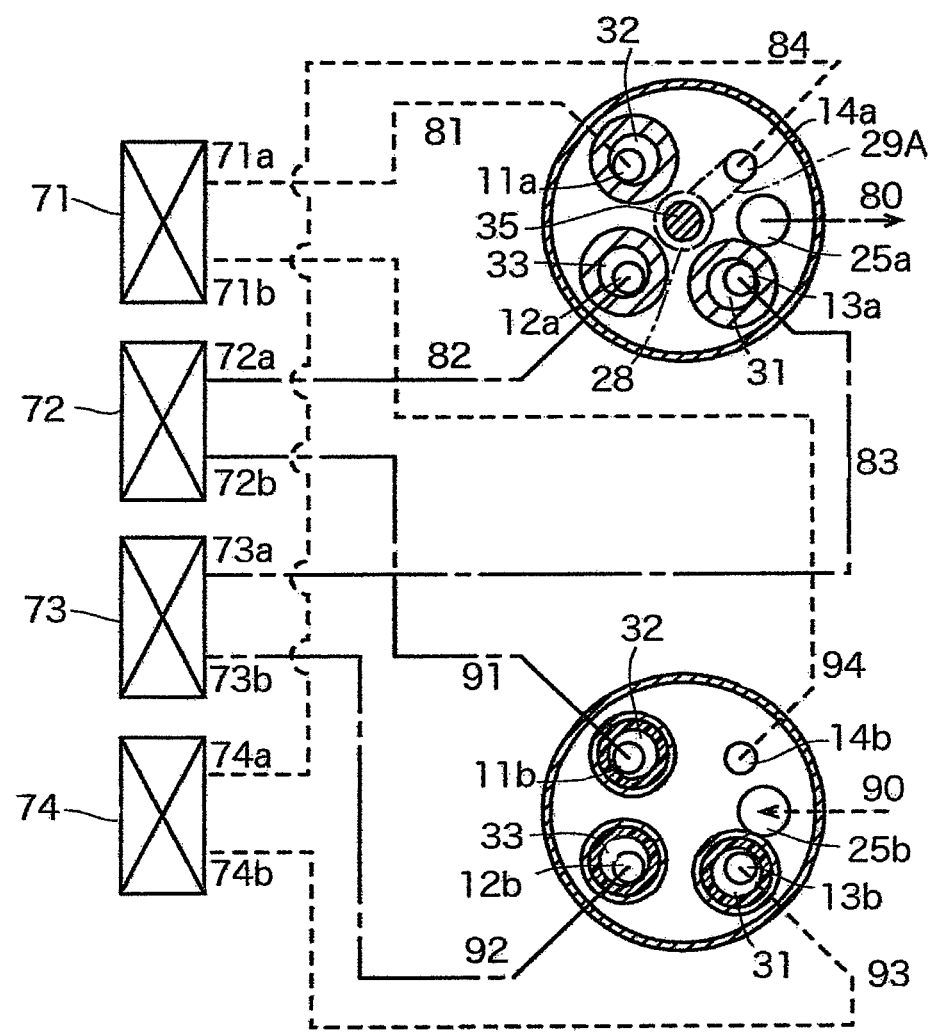
FIG. 10 is a view provided for explanation of the configuration and the operation of the channel-switching valve of embodiment 3 (heating operation time).
Figure 11:
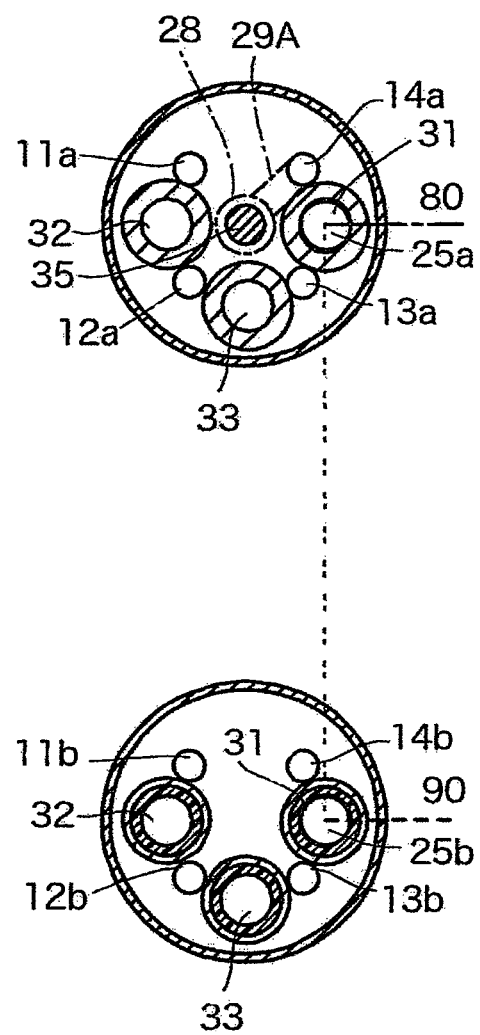
FIG. 11 is a view provided for explanation of the configuration and the operation of the channel-switching valve of embodiment 3 (defrosting operation time).

Further, when three communication paths (31, 32 and 33) are adopted as in embodiment 3 shown in FIGS. 9 to 11, the heat exchangers 71 to 74 are connected in parallel at the time of the normal direction flow (cooling operation time), but at the time of the aforesaid reverse direction flow (heating operation time), all the heat exchangers 71 to 74 are connected in series as one group (FIG. 10).

In the above described FIGS. 6 to 11, a pair of stoppers 101 and 102 described in embodiment 1 are not illustrated, but stoppers are provided at the position for restricting the position of the valve body as described in embodiment 1.

Figure 12:
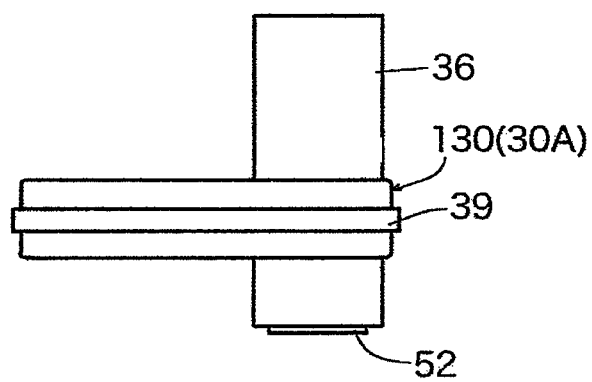
FIG. 12 is a side view of a valve body for use in a channel-switching valve of embodiment 4.
Figure 13:
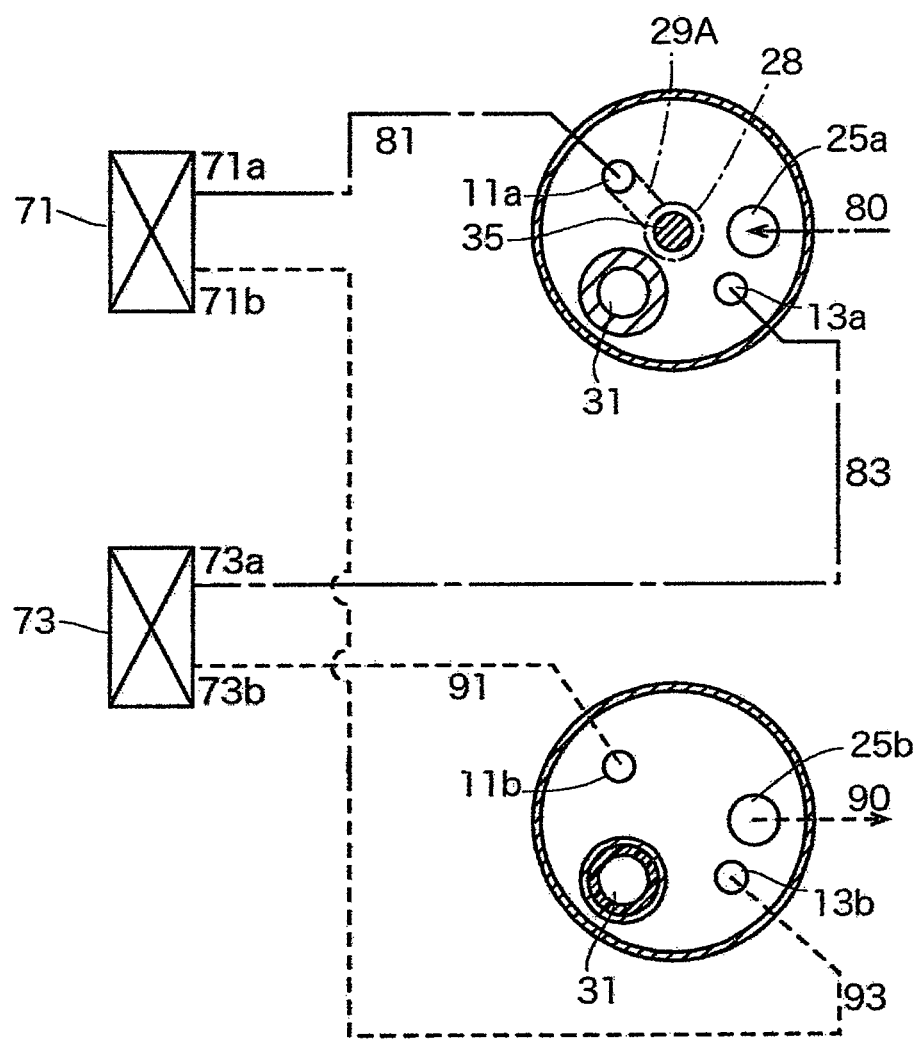
FIG. 13 is a view provided for explanation of a configuration and an operation of the channel-switching valve of embodiment 4 (cooling operation time).
Figure 14:
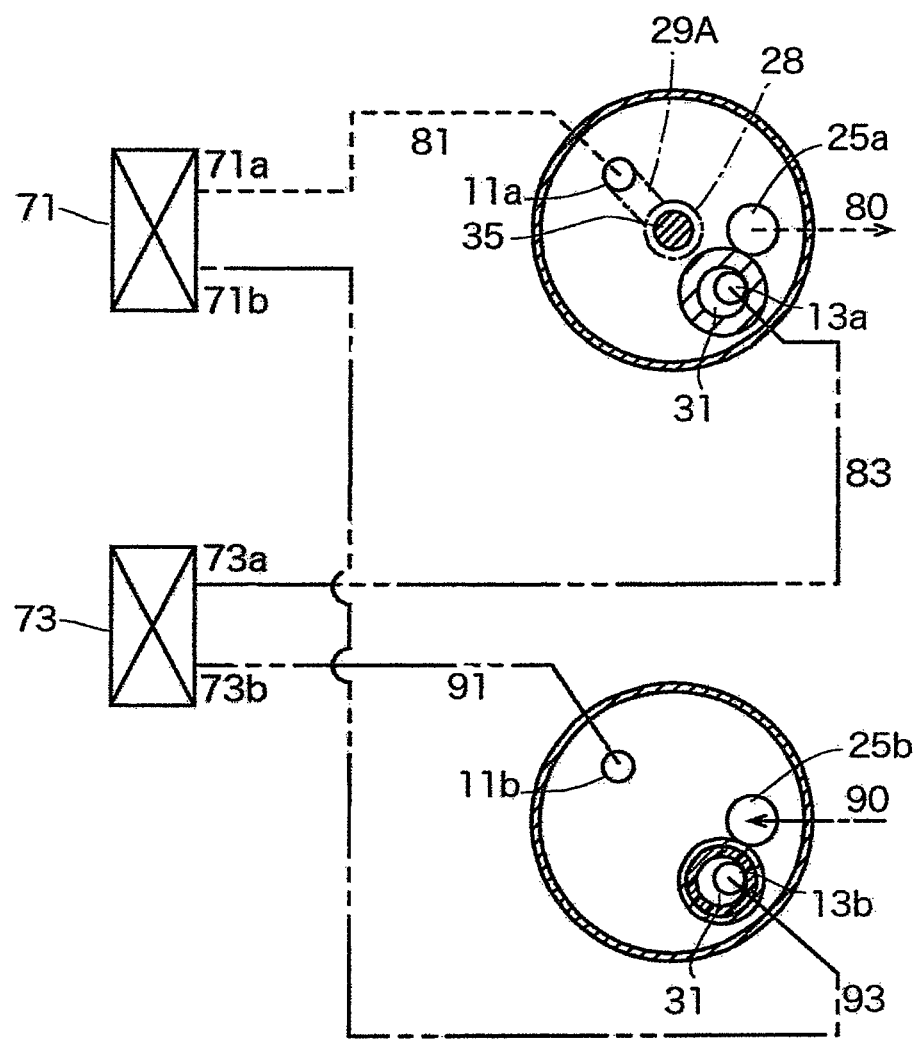
FIG. 14 is a view provided for explanation of the configuration and the operation of the channel-switching valve of embodiment 4 (heating operation time).
Figure 15:
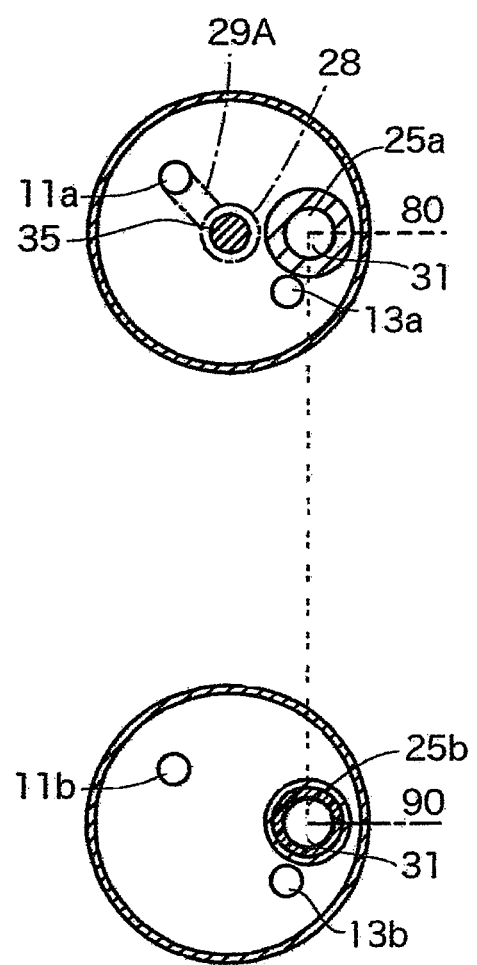
FIG. 15 is a view provided for explanation of the configuration and the operation of the channel-switching valve of embodiment 4 (defrosting operation time).

FIG. 12 is a side view of a valve body for use in a channel-switching valve of embodiment 4. FIGS. 13 to 15 are views provided for explanation of a configuration and an operation of the channel-switching valve of embodiment 4 respectively, and are views similar to FIGS. 3 to 5, FIGS. 6 to 8 and FIGS. 9 to 11. In FIGS. 12 to 15, the same reference symbols as FIGS. 1 to 11 show the same or equivalent portions respectively.

Embodiment 4 is for connecting two heat exchangers (reference symbols 71 and 73), and the channel-switching valve is provided with two inlet/outlet ports at each of the top and bottom. Further, as in embodiment 2, a valve body 130 is the result of removing the cylindrical section 37 from the valve body 30 shown in FIG. 2C, and the base body section 30A in the thick disk shape is provided with only one cylindrical section 36.

In embodiment 4, the heat exchangers 71 and 73 are connected in parallel at the time of normal direction flow (cooling operation time) as shown in FIG. 13, but at the time of the reverse direction flow (heating operation time), the heat exchangers 71 and 73 are connected in series as shown in FIG. 14.

In FIGS. 13 to 15, a pair of stoppers 101 and 102 described in embodiment 1 are not illustrated, but stoppers are provided at the position for restricting the position of the valve body as in embodiments 1 to 3.

The number of inlet/outlet ports, the number of communication paths and the like are not limited to those of the above described embodiments, and can be appropriately changed in accordance with the number of heat exchangers, the required connection mode and the like.

Further, introduction of the fluid to the channel-switching valve may be performed from any of the upper side main port 25a and the lower side main port 25b.

Further, the modes of defrosting shown in FIGS. 5, 8, 11 and 15 are not needed when they are not needed in the heat pump system in which the channel-switching valve is used. In such a case, arrangement of the upper side main port 25a and the lower side main port 25b does not have to be in a relation in which they are paired at the top and bottom as the relations of the upper side inlet/outlet ports 11a to 14a and the lower side inlet/outlet ports 11b to 14b.

Furthermore, the upper side inlet/outlet port and the lower side inlet/outlet port (for example, reference symbols 12a and 12b and/or 14a and 14b in embodiment 1) which are not allowed to communicate with each other by the communication path provided in the valve body do not have to be in the relation in which they are paired at the top and bottom.

Furthermore, the channel-switching valve of the present invention also can be applied to the system in which the indoor heat exchangers are connected in series at the time of cooling, and the indoor heat exchangers are connected in parallel at the time of heating, and can switch the connection of a plurality of outdoor heat exchangers to series connection and parallel connection.

Furthermore, in the aforementioned description, the channel-switching valve switches connection to parallel connection or series connection in accordance with the passing direction of the fluid (refrigerant), but it goes without saying that when the passing direction of the refrigerant is not switched, the channel-switching valve can switch the connection to series connection from parallel connection, or to parallel connection from series connection, in accordance with the situation of the load of the heat exchanger, for example.

Furthermore, it goes without saying that the channel-switching valve of the present invention also can be applied to any system which switches the channels of a plurality of devices, that is, a plurality of devices including inlet ports and outlet ports for a fluid in series and in parallel, or shuts off the channels of the plurality of devices to bypass the channels, other than heat pumps.

What is claimed is:

1. A channel-switching valve, comprising:
   a valve main body provided with a valve chamber having an upper side valve seat section and a lower side valve seat section;
   a valve body which is rotated with upper and lower end surfaces of the valve body opposed to and in contact with the upper side valve seat section and the lower side valve seat section; and
   an actuator which rotationally drives the valve body,
   wherein a plurality of ports which communicate with an exterior of the valve main body are formed in the upper side valve seat section, and a plurality of ports which communicate with the exterior of the valve main body are formed in the lower side valve seat section;
   wherein the plurality of ports formed in the upper side valve seat section serve as a plurality of upper side inlet/outlet ports and an upper side main port, and the plurality of ports formed in the lower side valve seat section serve as a plurality of lower side inlet/outlet ports which are paired with the plurality of upper side inlet/outlet ports and a lower side main port;
   wherein the lower side main port is paired with the upper side main port;
   wherein the valve body is provided with at least one communication path which can allow the plurality of ports formed in the upper side valve seat section and the plurality of ports formed in the lower side valve seat section to communicate with each other;
   wherein the valve chamber is substantially hermetically divided into an upper chamber section including the upper side valve seat section and a lower chamber section including the lower side valve seat section by the valve body;
   wherein the at least one communication path allows at least one port formed in the upper side valve seat section and at least one port formed in the lower side valve seat section to communicate with each other or does not allow all ports formed in the upper side valve seat section and all ports formed in the lower side valve seat section to communicate with each other in accordance with a rotational position of the valve; and
   wherein the valve body can take a third rotation position in which only the upper and lower side main ports are allowed to communicate with each other, in addition to the first and the second rotation positions.

2. The channel-switching valve according to claim 1, wherein:

each of the upper side valve seat section and the lower side valve seat section is provided with four inlet/outlet ports;

the valve body is provided with two of the communication paths to allow any two of the four pairs of inlet/outlet ports to communicate with each other; and the valve body can take the first rotation position in which the two communication paths do not allow any of the four pairs of inlet/outlet ports to communicate with each other, and the second rotation position in which the two communication paths allow any two ports among the four pairs of inlet/outlet ports to communicate with each other.

3. The channel-switching valve according to claim 1, wherein:

each of the upper side valve seat section and the lower side valve seat section is provided with two inlet/outlet ports;

the valve body is provided with one communication path to allow any one of the two pairs of inlet/outlet ports to communicate with each other; and the valve body can take the first rotation position in which the one communication path does not allow any of the two pairs of inlet/outlet ports to communicate with each other, and the second rotation position in which the one communication path allows any one port among the two pairs of inlet/outlet ports to communicate with each other.

4. The channel-switching valve according to claim 1, wherein:

each of the upper side valve seat section and the lower side valve seat section is provided with [N] of inlet/outlet ports;

the valve body is provided with 1 to [N−1] of the communication paths to allow any one to [N−1] of the [N] pairs of inlet/outlet ports to communicate with each other; and the valve body can take the first rotation position in which the 1 to [N−1] communication path or paths does not or do not allow any of the [N] pairs of inlet/outlet ports to communicate with each other, and the second rotation position in which the 1 to [N−1] communication path or paths allows or allow any one to [N−1] port or ports among the [N] pairs of inlet/outlet ports to communicate with each other.

5. The channel-switching valve according to claim 1, wherein on at least one end side of the communication path, a communication path seal member is fitted onto an open end of the communication path to prevent leakage into the valve chamber from the communication path, and to bring the open end of the communication path elastically into pressure contact with the valve seat section.

6. The channel-switching valve according to claim 1, wherein pressure receiving diameters of both ends of the communication path are set to be the same or substantially the same.

7. The channel-switching valve according to claim 1, wherein the valve body includes a valve chamber seal member for hermetically partitioning the upper chamber section and the lower chamber section of the valve chamber.

8. The channel-switching valve according to claim 1, wherein the actuator is provided on a side of the upper chamber section of the valve main body, and the valve main body is provided with a pressure equalizing hole which allows the upper chamber section and an inside of the actuator to communicate with each other.

9. The channel-switching valve according to claim 8, wherein the pressure equalizing hole opens to a port which does not communicate with the communication path of the valve body even when the valve body is rotated.

10. A heat pump system, comprising:
a compressor;
an expansion valve;
a plurality of heat exchangers; and
a channel-switching valve, the channel-switching valve including:
a valve main body provided with a valve chamber having an upper side valve seat section and a lower side valve seat section;
a valve body which is rotated with upper and lower end surfaces of the valve body opposed to and in contact with the upper side valve seat section and the lower side valve seat section; and
an actuator which rotationally drives the valve body,
wherein a plurality of ports which communicate with an exterior of the valve main body are formed in the upper side valve seat section, and a plurality of ports which communicate with the exterior of the valve main body are formed in the lower side valve seat section;
wherein the plurality of ports formed in the upper side valve seat section serve as a plurality of upper side inlet/outlet ports and an upper side main port, and the plurality of ports formed in the lower side valve seat section serve as a plurality of lower side inlet/outlet ports which are paired with the plurality of upper side inlet/outlet ports and a lower side main port;
wherein the valve body is provided with at least one communication path which can allow the plurality of ports formed in the upper side valve seat section and the plurality of ports formed in the lower side valve seat section to communicate with each other;
wherein the valve chamber is substantially hermetically divided into an upper chamber section including the upper side valve seat section and a lower chamber section including the lower side valve seat section by the valve body;
wherein the at least one communication path allows at least one port formed in the upper side valve seat section and at least one port formed in the lower side valve seat section to communicate with each other or does not allow all ports formed in the upper side valve seat section and all ports formed in the lower side valve seat section to communicate with each other in accordance with a rotational position of the valve; and
wherein a connection state of the plurality of heat exchangers is switched from parallel connection to series connection, and from series connection to parallel connection in accordance with necessity, by the channel-switching valve.

11. The heat pump system according to claim 10, wherein:
an actuator of the channel-switching valve is provided on a side of an upper chamber section formed in the valve main body; and
a refrigerant discharged from the compressor is introduced into a side of a lower chamber section formed in the valve main body.

12. The heat pump system according to claim 10, wherein the valve main body is provided with a pressure equalizing hole which allows the upper chamber section and an inside of the actuator to communicate with each other.

13. The heat pump system according to claim 12, wherein the pressure equalizing hole opens to a port which does not communicate with a communication path of the valve body even when the valve body is rotated.

* * * * *